United States Patent [19]
Bower

[11] Patent Number: 5,402,971
[45] Date of Patent: Apr. 4, 1995

[54] CABLE TIE HAVING LOOP ATTACHMENT

[75] Inventor: Thomas G. Bower, Auburn, Calif.

[73] Assignee: Hewlett-Packard Company, Palo Alto, Calif.

[21] Appl. No.: 245,318

[22] Filed: May 18, 1994

[51] Int. Cl.⁶ .............................................. F16L 3/08
[52] U.S. Cl. ................................. 248/74.3; 24/16 PB
[58] Field of Search ................... 248/74.3, 65, 68.1, 248/74.2; 24/16 PB, 17 AP, 30.5

[56] References Cited

U.S. PATENT DOCUMENTS

| | | | |
|---|---|---|---|
| 2,936,980 | 5/1960 | Rapata | 248/74.3 X |
| 3,022,557 | 2/1962 | Logan | 248/74.3 X |
| 3,224,054 | 12/1965 | Lige | 248/74.3 X |
| 3,568,262 | 3/1971 | Woldman | 248/74.3 X |
| 4,191,334 | 3/1980 | Bulanda et al. | |
| 4,393,548 | 7/1983 | Herb | |
| 4,501,049 | 2/1985 | Adamson | 24/17 AP X |
| 4,631,783 | 12/1986 | Hayashi | 24/16 PB |
| 4,752,054 | 6/1988 | Jonsson | 24/16 PB X |
| 5,131,613 | 7/1992 | Kamiya et al. | |

FOREIGN PATENT DOCUMENTS

| | | | |
|---|---|---|---|
| 1097213 | 1/1968 | United Kingdom | 24/16 PB |
| 2068448 | 8/1981 | United Kingdom | 248/74.3 |

Primary Examiner—J. Franklin Foss

[57] ABSTRACT

A one piece cable tie for securing one or more wires/cables together and to a supporting post of a cable management bar. The cable tie includes an elongated flexible planar strap having a plurality of ratchet teeth disposed on opposite sides of the strap. An integral locking head, located at one end of the strap, has a channel therethrough for receiving and releasably restraining the strap ratchet teeth when the opposite strap end is inserted through the locking head channel. Located in proximity to the locking head is a post retaining loop disposed transversely to the strap body. The retaining loop has a passageway shaped to receive and retain the post of an associated cable management bar, so that when positioned and looped over the post, the cable tie secures the cables together and also provides support thereto.

6 Claims, 3 Drawing Sheets

CABLE TIE HAVING LOOP ATTACHMENT

BACKGROUND OF THE INVENTION

The present invention generally pertains to cable tie fasteners used for example, for tying bundles of electrical cables and wires together, and more particularly to a unique one-piece cable tie fastener having an integral loop for use in conjunction with a cable management bar for not only tying the bundled cables together, but also for securing the wires/cables to a cable management bar or the like.

Cable ties have long been advantageously used to bundle elongated articles together, such as electrical cables, wires, pneumatic hoses, etc. Waxed string was one of the earliest devices used to simply tie electrical wires together. Eventually string was replaced by the plastic cable tie which today is preferably made of a highly resilient thermoplastic material, such as Nylon ® or Halar ®.

In general most commercially available cable ties consist of an elongated flexible strap having a pointed or rounded tip at one end and a locking head at the opposite end. The locking head receives the opposing end and a portion of the strap to form a noose or loop of variable size to secure cables therein. Typically transverse teeth extend between the longitudinal edges on at least one side. The locking head usually has a pawl designed to engage the transverse teeth and retain the strap once wound around the cable bundle. When inserted into the locking head, the strap is tightened to the desired degree of tension by pulling the strap through the pawl either manually or with a locking tool specifically designed for this purpose. When tight, the end of the strap is released causing the locking head to engage one or more of the transverse teeth thus preventing the strap from being released. In the case of nonreleasable ties, once the strap is locked in place, the loose end of the strap is often cut off to prevent it from interfering with placement of the wire/cable bundle. This again is performed manually either with wire cutters or with a specially designed multifunctional cutting tool.

There are many variations of this basic strap design depending upon the particular application or function desired. For example, some of the locking heads have exotic mechanisms for releasing the pawl out of engagement with the teeth on the strap to produce a releasable and thus reusable cable tie, e.g., see U.S. Pat. Nos. 5,193,250 and 3,991,444. There are many variations of the basic locking mechanism to simplify construction, to provide superior pullout resistance or to provide a multitude of other advantages, e.g. see U.S. Pat. Nos. 5,193,251 or 4,490,887.

Present day cable ties are often used in the electrical industry to secure the multitude of cables and wires found extending from the rear of rack or cabinet mounted electrical apparatus. Another cable management device in use today is the rack-mounted cable manager. Its principal function is to provide a location for securing cable bundles (such as a wiring harness) via a cable tie to a desired location relative to electrical equipment in the rack. Another type of cable management device is the cable-mounted cable tie, e.g., sometimes seen on power cords of electrical consumer devices. Such devices are fine for home use and are economical. However, being attached to the cable itself is a bit of a disadvantage in attaching certain types of cables in certain applications, e.g., network/communication cables. The attachment tie is often hard to find in a large bundle of cables, and there is no easy way of attaching the tie to a mounting post, whether in close proximity or not to the point of attachment of the cable tie.

This invention is directed to practical techniques for providing an improved reusable cable tie that overcomes many of these problems.

A principal object of this invention is the provision of an inexpensive cable tie of one-piece construction having an auxiliary integral loop for securely receiving the post of a cable management bar and securing the cable bundle to a fixed location.

SUMMARY OF THE INVENTION

In accordance with the teachings of the present invention, these and other objectives are achieved through a practical one-piece cable tie made of a resilient material for securing one or more wires/cables together and to a supporting post such as is found in a cable management bar. The cable tie includes an elongated flexible planar strap having a plurality of ratchet teeth disposed on opposite sides of the strap. A locking head, located at one end of the strap, has a channel therethrough adapted to receive and releasably lock the strap ratchet teeth when the strap end opposite said locking head is inserted through the locking head channel. Located in proximity to the locking head is a post retaining loop disposed transversely to the strap body. The retaining loop has a passageway shaped to receive and retain the post of the associated cable management bar, so that when positioned and looped over the post, the cable tie secures the cables together and also provides support to the bundled cables.

An important feature of the present invention is that such a cable tie design provides a flat article conducive for easy high-volume/low cost injection molding. (It has no slides or lifters which is important for tool life, reliability and ease of construction.)

BRIEF DESCRIPTION OF THE DRAWINGS

For a better understanding of the invention as well as further features thereof, reference is made to the accompanying drawings wherein.

DETAILED DESCRIPTION

Figure 1:
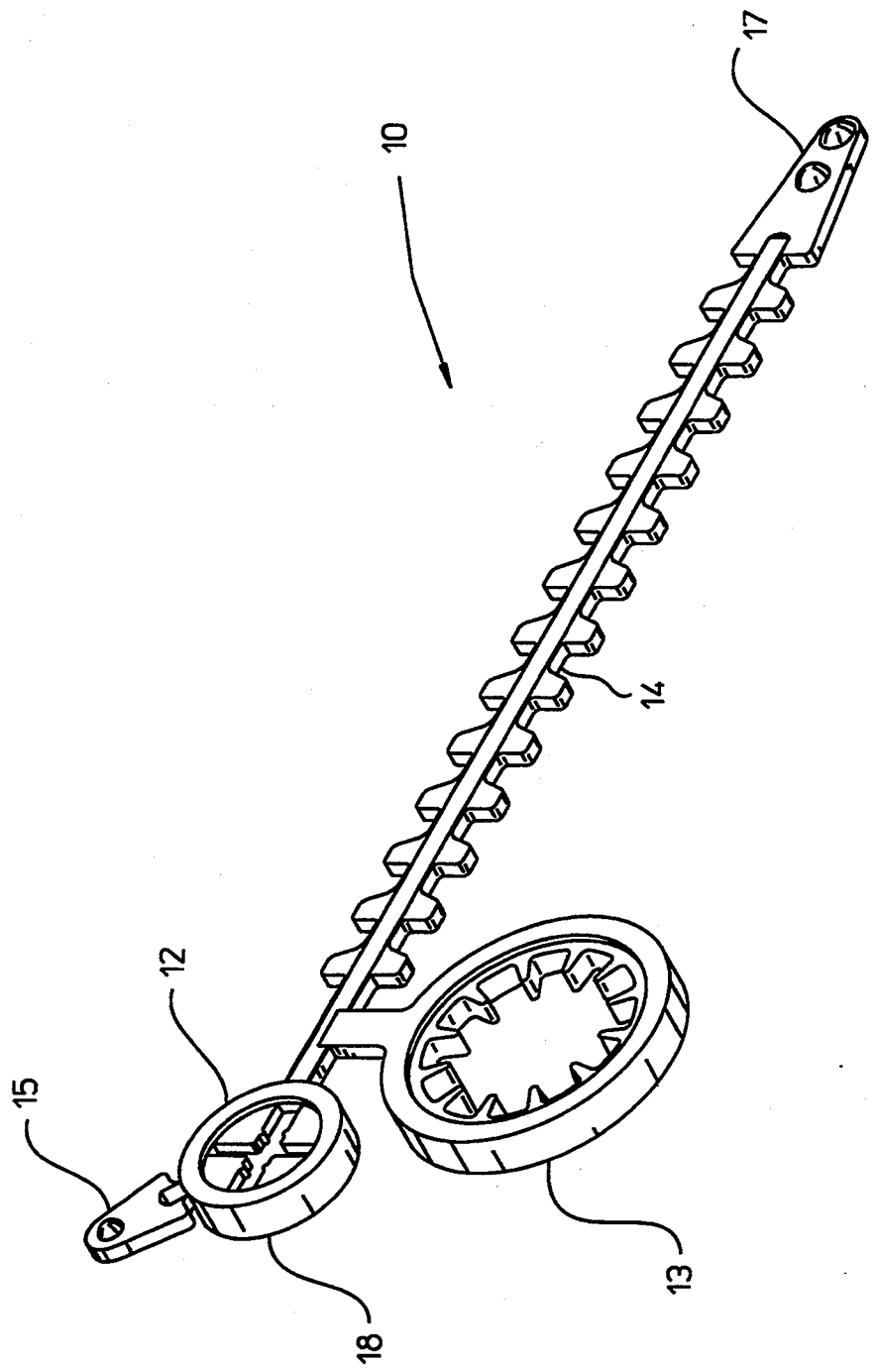
FIG. 1 is a perspective view of the cable tie according to a preferred embodiment of the present invention.
Figure 2:
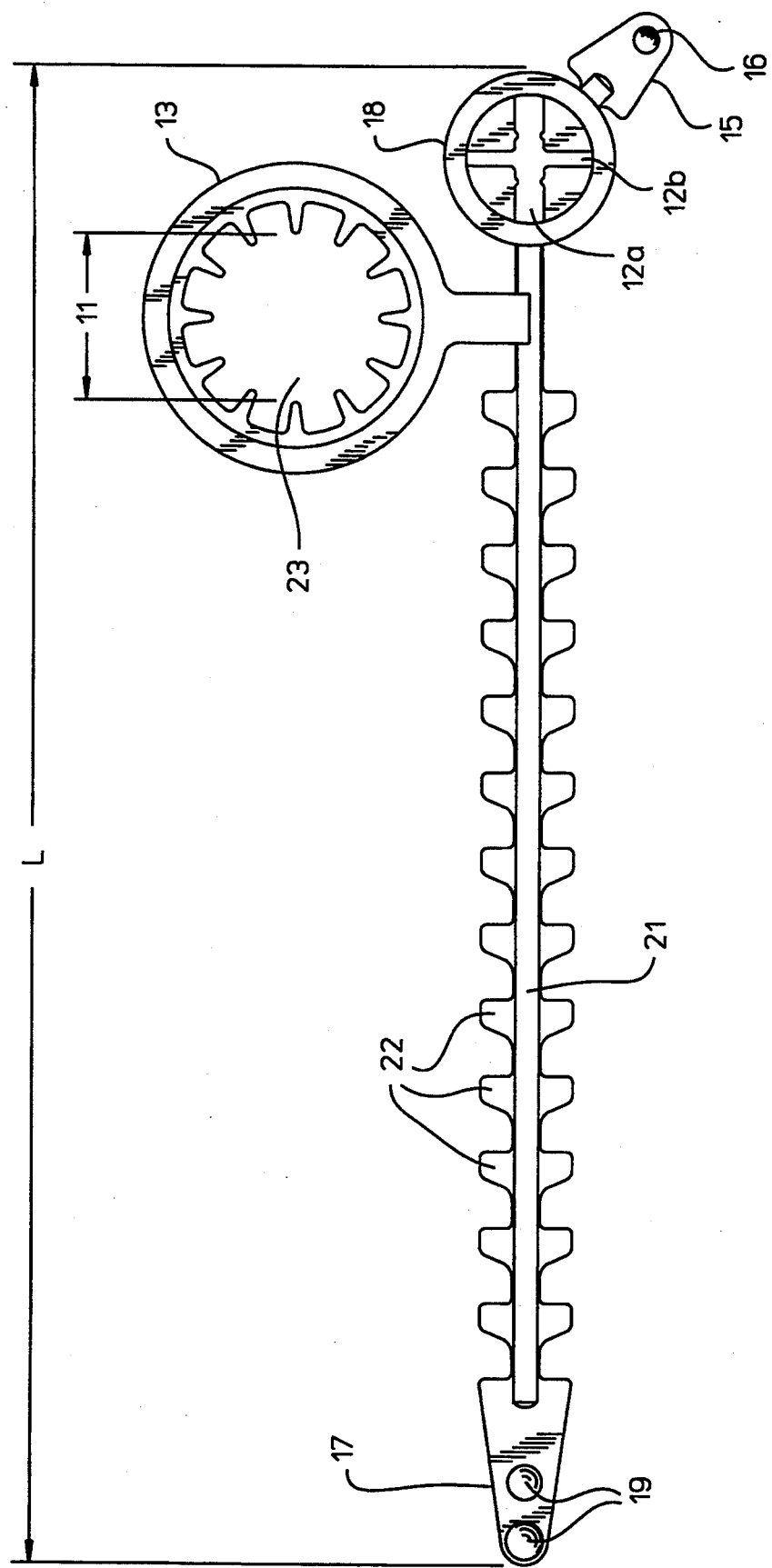
FIG. 2 is a front planar view of the cable tie shown in FIG. 1.

A one-piece cable tie embodying the concept of the present invention is designated by the number 10 in FIGS. 1 and 2. Referring to FIGS. 1 and 2, cable tie 10 is formed of a flexible, tough, slightly rubbery material, such as Santoprene ™ 101-87 made by Monsanto Corporation. Cable tie 10 includes an elongated planar strap 14, having ratchet teeth 22 disposed as shown on both sides of strap 14, an integral locking head 12, an angled tab 15, and an auxiliary loop 13 all being integrally molded into a one-piece cable tie. Locking head 12 is preferably a circular disc having a pair of cruciate channels 12a and 12b therethrough to receive and retain the strap ratchet teeth 22 when the strap end 17 opposite the locking head is threaded through the channels. The channel 12a is wider than the other channel 12b to accommodate the width of only the central body of strap 14, i.e., not including the ratchet teeth 22, when inserted therethrough in a locked position.

The rounded strap tip 17 functionally aids in threading the loose end of strap 14 into the locking head 12 when strap 14 is flexed into a loop for holding a bundle of cables (not shown). The purpose of auxiliary loop 13 is to receive a standard support post in a cable management bar, and although it is preferably disposed on strap 14 as shown in the Figures in close proximity to the locking head 12, it can be positioned almost anywhere on the strap 14. However, since the loop 13 is too large to pass through either of the channel 12a or 12b, its placement on the strap 14 indirectly limits the minimum diameter of the bundle that can be tightly contained by the looped strap 14.

The length L of strap 14 is preferably 12 to 15 cm, but it can be any practical length desired—the limiting parameter being the minimum loop/bundle size desired, i.e., the shorter the length L, the smaller the size of the bundle that can be accommodated. As shown in FIG. 2, strap 14 includes a raised center section 21 added to strap 14 to increase the tensile strength of the strap. The strap 14 also includes two parallel rows of ratchet teeth 22 longitudinally spaced along the strap 14 and aligned laterally as shown in FIG. 2. Each tooth is shaped such that the face closer to the tip 17 is acutely angled relative to the longitudinal axis to facilitate insertion and sliding into the locking head 12. The face of each tooth closer to the locking head is transverse to the longitudinal axis of the strap to facilitate retention in the locking head 12. The ratchet teeth 22 are designed to engage the uppermost portion 18 of channel 12a for locking the strap in the desired position. Channel 12b is sufficiently wide to permit the ratchet teeth 22 to slide therethrough when tip 17 is inserted into and pulled through channel 12a or 12b. To tighten the strap 14 around a cable bundle, the tip 17 and the body of strap 14 are pulled through the locking head 12 to the desired tension. To lock the strap 14 in the desired position, it is manually pulled toward the outer or uppermost end 18 of the locking head 12. This wedges the strap body 14 into the outer portion of the channel 12a and causes one pair of the ratchet teeth 22 to engage the sides of channel 12a. Alternatively tip 17 may be rotated 90° and inserted through the wider channel 12a and then twisted back 90° before being locked in the same manner. To unlock or release the strap 14, tip 17 and the body of strap 14 are pulled downward and away from the upper end 18 of locking head 12 so that ratchet teeth 22 are released to slide back through the passageways in locking head 12.

Angled tab 15 functions as a finger or tool grip for holding the cable tie while pulling strap end 17 through the locking head. Tab 15 is angled away from the plane of the strap loop (formed by pulling the strap 14 through locking head 12) to keep the tab from interfering with the loose end of strap 14, and to aid in placing loop 13 into position relative to a cable management bar (not shown). In the preferred embodiment angled tab 15 has rounded bumps 16 on front and back surfaces to aid finger retention during installation in holding the strap. Similarly strap tip 17 has a multitude of such rounded bumps 19 on front and back surfaces having the same basic purpose; namely, to aid in manually holding that portion of the cable tie while installing the tie around the cable bundle.

Auxiliary loop 13 is adapted to receive a support post (not shown) of a cable management bar, which are commercially available from a number of manufacturers. Such cable management post slides through passageway 23 to provide support for the tie and the cable bundle. The inner diameter 11 of loop 13 must roughly be the same size as the corresponding cable management post it must receive. Since different manufacturers have different size posts, a number of different cable tie designs may be used advantageously to accommodate the different sizes. In the preferred embodiment the loop 13 also has a multitude of integral teeth 27 for gripping onto the cable management post it must receive, yet be loose enough to permit rotation or removal of the loop 13 from the post. So, when strap 14 is secured around a cable bundle, loop 13 may be attached to the cable management post to hold the cable tie and the cable bundle in place relative to the equipment rack associated therewith.

Figure 3:
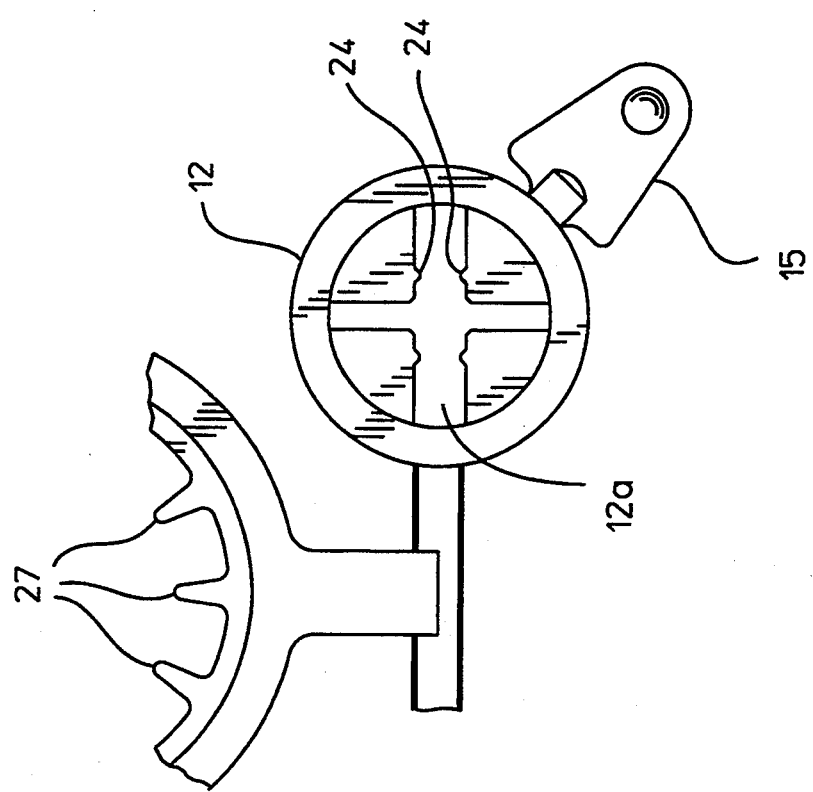
FIG. 3 is an exploded front planar view of the locking head portion of the cable tie depicted in FIGS. 1 and 2.

Referring to FIG. 3, locking head 12 is shown in greater detail to particularly point out the plurality of small protuberances 24 (ridges) located on the inner surfaces of channels 12a and 12b for aiding the retention of strap 14 while in a locked position in the locking head. These small protuberances 24 extend across the width of the channels (e.g., 2 mm in length) and are approximately 0.5 mm in height.

In an alternate embodiment, locking head 12 could be designed to have any particular shape desired, and channels 12a and 12b could be T-shaped instead of crossed as shown in the Figures, or a single channel could perform the same function. For a single channel similar to channel 12a, tip 17 could be inserted and then twisted 90° before being locked in the manner described above. Similarly the auxiliary loop 13 is shown as a circular loop; however, other shaped loops or hooks could perhaps work equally well. In addition, there are a multitude of releasable locking heads that could be used equally well for locking head 12.

Various changes to the foregoing will be seen by those skilled in the art and may evidently be introduced without departing from the spirit of the invention. For example, although the preferred device has been described as a cable or wire tie, almost any elongated object may be securely held to advantage by the subject invention. In addition, although the preferred device has been described for use in conjunction with a cable management bar, almost any elongated protuberance or hook may be used to secure the tie and its bundle to advantage.

Accordingly, the disclosure of the present invention is intended to be illustrative, but not limiting, of the scope of the invention, which is set forth in the following claims.

What is claimed is:

1. A one-piece self-latching reusable cable tie made of a resilient material for securing one or more elongated objects together and to a supporting post comprising:
   an elongated flexible planar strap having ratchet teeth disposed on opposite sides of said strap;
   an integral locking head located at one end of said strap, said locking head having a pair of cruciate channels adapted to receive and releasably retain said strap ratchet teeth when the strap end opposite said locking head is flexed around said elongated objects and inserted through one of said locking head channels;
   a post retaining means disposed transversely to said strap and toward said locking head, said post retaining means having a passageway adapted to receive and retain said post, thereby providing support to said elongated objects held by said strap; and an integrally molded support tab attached to and disposed laterally of said locking head to aid in holding said strap during installation for bundling said elongated objects.

2. A one-piece self-latching cable tie as in claim 1, wherein one of said locking head channels has a wider channel opening than the other channel.

3. A one-piece self-latching cable tie as in claim 2, wherein said strap, said locking head and said post retaining means are integrally molded of the same resilient material.

4. A one-piece self-latching cable tie as in claim 3, wherein said locking head channel having the wider opening further comprises a plurality of raised ridges disposed on interior surfaces thereof for aiding in the retention of said strap ratchet teeth when said strap is inserted through said locking head channel having the wider opening.

5. A one-piece self-latching cable tie as in claim 4, wherein said post retaining means is located in close proximity to said locking head.

6. A one-piece self-latching reusable cable tie made of a resilient material for securing one or more elongated objects together and to a supporting post comprising:

an elongated flexible planar strap having a plurality of ratchet teeth disposed on opposite sides of said strap;

an integral locking head located at one end of said strap, said locking head having a pair of cruciate channels adapted to receive and releasably retain said strap ratchet teeth when the strap end opposite said locking head is inserted through one of said cruciate channels, said channels also having a plurality of raised ridges disposed on interior surfaces thereof for aiding in the retention of said strap ratchet teeth when said strap is inserted through said locking head channels;

an auxiliary loop disposed transversely to said strap and in close proximity to said locking head, said auxiliary loop having a passageway therethrough and a plurality resilient planar fingers extending axially inward to said passageway for retaining said post, said auxiliary loop being integrally molded to said strap; and an integrally molded support tab attached to and disposed laterally of said locking head to aid in manually holding said strap.

* * * * *